(12) United States Patent
Frame

(10) Patent No.: US 6,963,278 B2
(45) Date of Patent: Nov. 8, 2005

(54) METHOD AND APPARATUS FOR ENHANCING SAFETY WITHIN A WORK ZONE

(76) Inventor: Gary M. Frame, 7407A Navajo Pass, Volente, TX (US) 78641

( * ) Notice: Subject to any disclaimer, the term of this patent is extended or adjusted under 35 U.S.C. 154(b) by 221 days.

(21) Appl. No.: 10/358,588

(22) Filed: Feb. 5, 2003

(65) Prior Publication Data

US 2003/0151508 A1 Aug. 14, 2003

Related U.S. Application Data

(60) Provisional application No. 60/356,785, filed on Feb. 13, 2002.

(51) Int. Cl.[7] ............................. G08B 1/08; H04Q 7/00
(52) U.S. Cl. .................... 340/539.22; 340/679
(58) Field of Search ..................... 340/539.22, 908.1, 340/685, 426.36, 425.5, 539.23, 539.11, 679, 340/680, 686.6

(56) References Cited

U.S. PATENT DOCUMENTS

| | | | |
|---|---|---|---|
| 4,928,101 A | * | 5/1990 | Favors ..................... 340/943 |
| 4,937,795 A | | 6/1990 | Motegi et al. |
| 5,198,800 A | * | 3/1993 | Tozawa et al. ........... 340/573.1 |
| 5,939,986 A | * | 8/1999 | Schiffbauer et al. ..... 340/573.1 |
| 6,073,064 A | * | 6/2000 | Konrad et al. ............ 701/36 |
| 6,208,260 B1 | | 3/2001 | West et al. |
| 6,784,800 B2 | * | 8/2004 | Orzechowski ........... 340/679 |

\* cited by examiner

Primary Examiner—John Tweel, Jr.
(74) Attorney, Agent, or Firm—Tarolli, Sundheim, Covell & Tummino L.L.P.

(57) ABSTRACT

A method and apparatus for enhancing the safety in a work zone surrounding operating equipment including identifying workers within said work zone and warning unauthorized workers within said work zone.

9 Claims, 2 Drawing Sheets

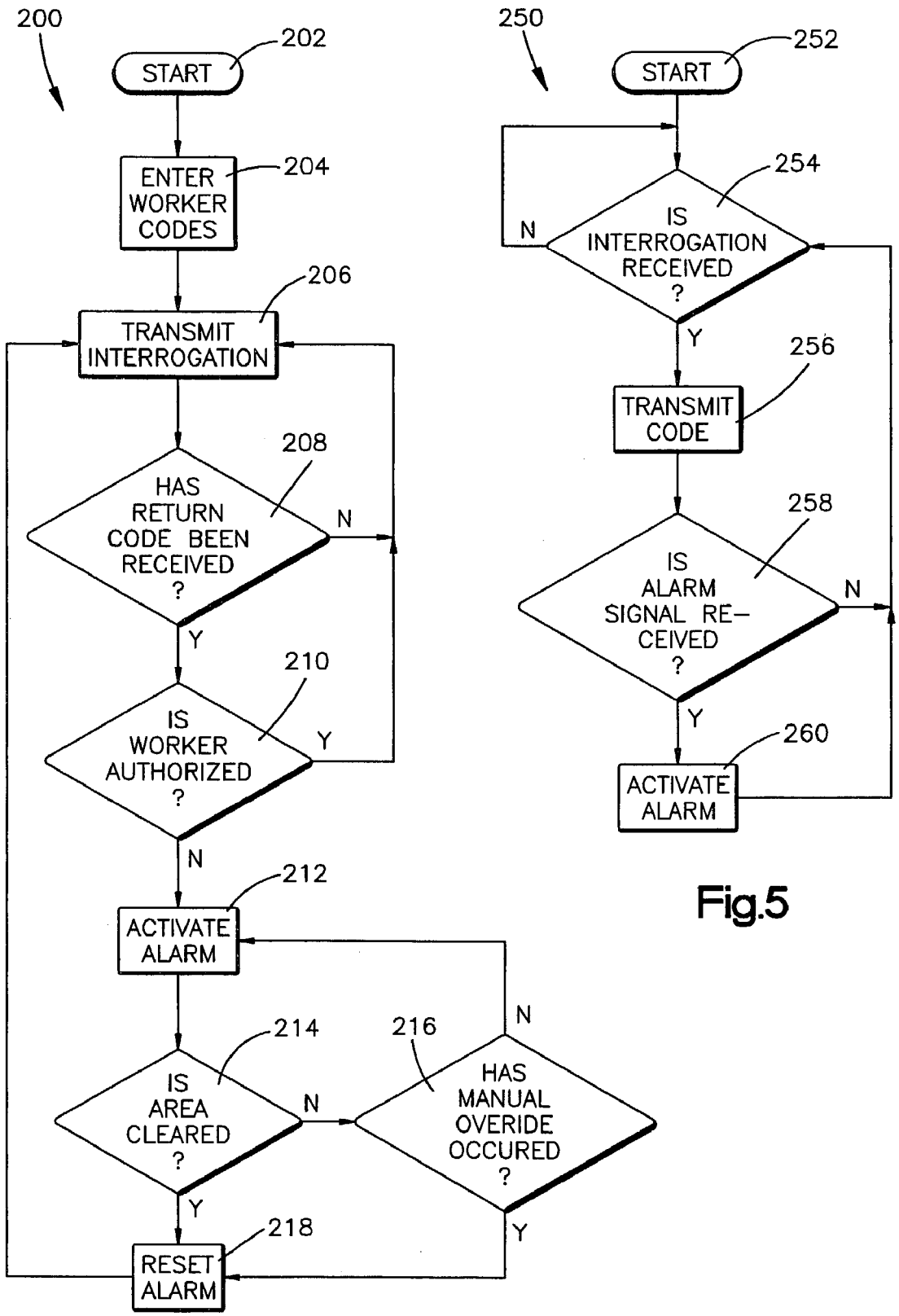

METHOD AND APPARATUS FOR ENHANCING SAFETY WITHIN A WORK ZONE

This application claims the benefit of Provisional Application No. 60/356,785, filed Feb. 13, 2002.

TECHNICAL FIELD

The present invention is directed to a method and apparatus for enhancing safety within a work zone and particularly directed to enhancing worker safety in the work zone associated with a work vehicle operating on a construction site.

BACKGROUND OF THE INVENTION

It is desirable to enhance worker safety particularly that of ground personnel working around the area of heavy equipment such as a construction vehicles on a construction site. If an operator of a large construction vehicle does not see a ground worker near such equipment, it is possible for a strike and run-over incident to occur.

SUMMARY OF THE INVENTION

An apparatus for enhancing the safety in a work zone surrounding operating equipment including means for identifying workers within said work zone and means for warning unauthorized workers within said work zone.

A method for enhancing the safety in a work zone surrounding operating equipment including the steps of identifying workers within said work zone and warning unauthorized workers within said work zone.

BRIEF DESCRIPTION OF THE DRAWINGS

The foregoing and other features and advantages of the present invention will become apparent to those skilled in the art to which the present invention relates upon reading the following description with reference to the accompanying drawings, in which:

FIG. 4 is a flow diagram of a control process for the vehicle controller in accordance with the present invention; and FIG. 5 is a flow diagram of a control process for the worker's portable warning unit in accordance with the present invention.

DESCRIPTION OF PREFERRED EMBODIMENT

Figure 1:
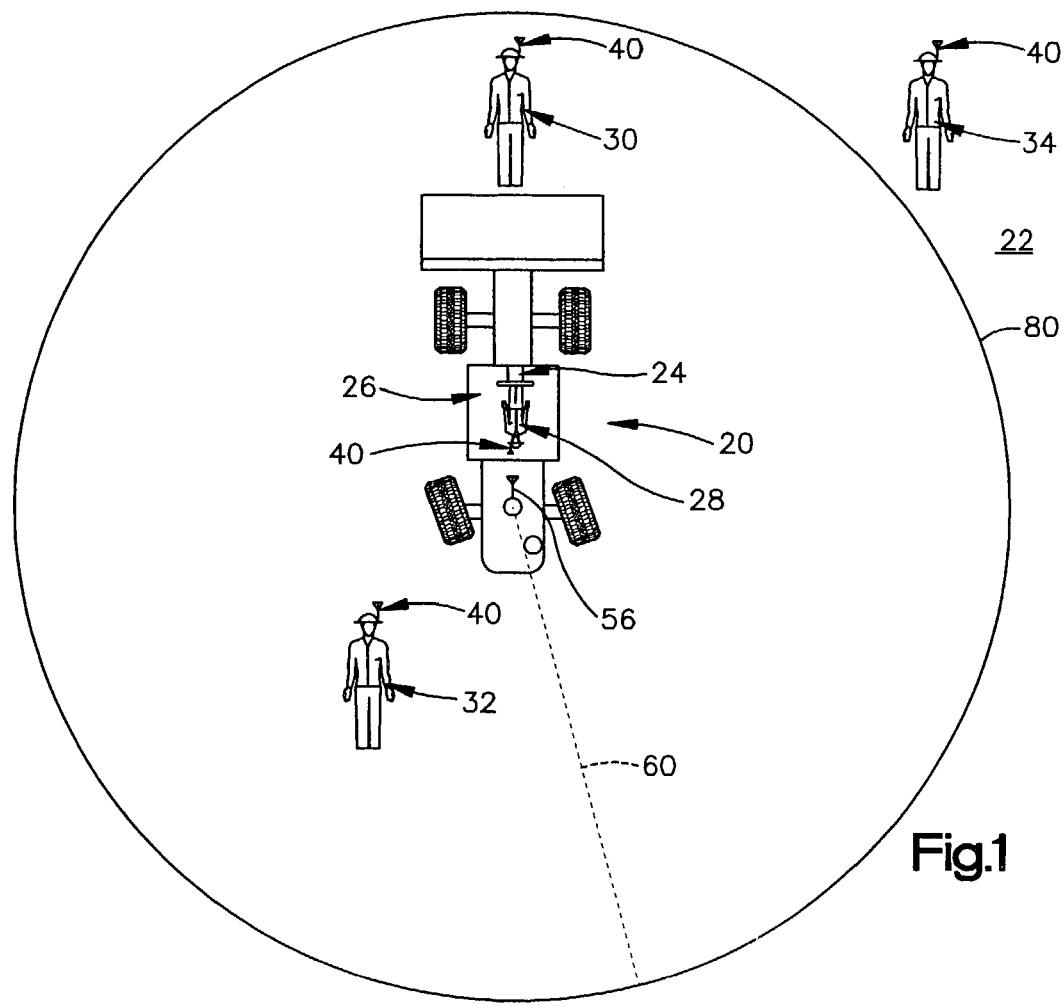
FIG. 1 is a schematic illustration of a construction vehicle and workers using a safety apparatus in accordance with the present invention.
Figure 2:
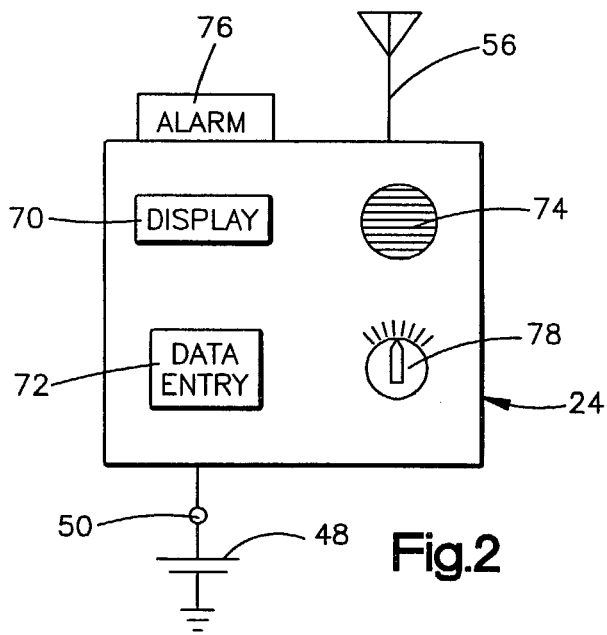
FIG. 2 is a schematic illustration of a vehicle control unit in accordance with the present invention.
Figure 3:
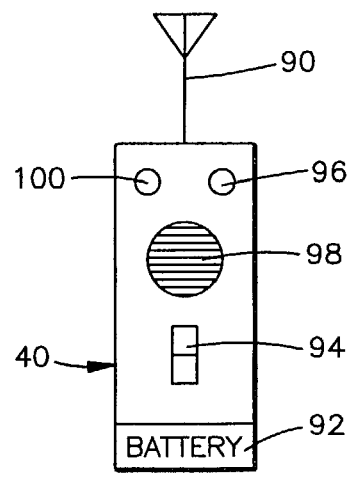
FIG. 3 is a schematic illustration of a worker's portable warning unit in accordance with the present invention.

Referring to the drawings, each vehicle 20 on a construction site 22 includes an associated vehicle mounted transceiver unit 24 mounted in the operator cab 26 and accessible to the vehicle operator 28. Each ground worker 30, 32, 34 wears an associated portable worker transceiver while he is on the construction site 22.

The vehicle mounted transceiver unit 24 may be mounted within the cab 26 and connected to the vehicle battery 48 for power so that when the vehicle 20 is turned on, i.e., is operating, the vehicle mounted transceiver unit 24 is powered. Alternatively, the vehicle mounted transceiver unit can be removably mounted within the vehicle cab, e.g., magnetically, Velcro, etc., and is connectable to the vehicle battery 48 via a plug in socket such as a cigarette-type socket 50. The vehicle mounted transceiver unit 24 could alternatively be powered by a self-contained battery.

The vehicle mounted transceiver unit 24 transmits a communication signal through an antenna 56 having a signal strength that transmits over an area having an adjustable or selectable radius 60 surrounding the vehicle 20. This area surrounding the vehicle over which the vehicle's transmitted signal can be received is referred to as the zone of danger or work zone of the vehicle. Since the zone of danger is vehicle-type dependent, e.g., backhoe, crane, etc., the size of the zone established by the vehicle transceiver is preferably adjustable. Alternatively, a particular vehicle mounted transceiver unit can be specifically arranged to have a fixed transmission diameter if it is going to be mounted in a known vehicle. Having the transmission diameter or work zone area variable allows a more universal application of a single vehicle mounted transceiver unit that can be used in any construction vehicle type. The present invention is also applicable to other heavy operating equipment such as a crane.

The signal emitted by the vehicle mounted transceiver unit 24 can be a radio-frequency ("RF") signal having controllable signal strength. Those skilled in the art will appreciate that other types of known communication signal may be used.

The size of the vehicle work zone or zone of danger surrounding a work vehicle is further dependent on the type and congestion of a particular construction site. In a typical congested construction site, it is anticipated that the signal strength for a front-end loader would be adjusted to provide a 15-foot danger zone around the vehicle. In a quarry operation where it is rare for ground personnel to be near the heavy equipment work vehicles, a 50-foot zone could be established.

The vehicle mounted transceiver unit 24 would include a display 70, a data entry device 72 such as a keyboard or keypad, an audible warning device 74, a visual warning device 76, and a signal strength adjustment device 78. The codes that match worker's portable units 40 that are permitted to be in the work area 80 can be entered through the data entry device 72. Signal strength to control the size of the work or danger zone 80 can be adjusted via the control 78 or alternatively through the data entry device 72.

The worker's portable warning device 40 is attachable to the worker's helmet or clothing in any known manner of attachment. The device 40 includes an antenna 90 for receiving and transmitting signals from and to vehicle mounted control units of vehicles or equipment within the construction site 22. The devices 40 further include a source of electrical energy such as a battery 92, an ON/OFF switch 94, a battery indicating light 96, an audible warning device 98, and a visual warning device 100. All persons on the construction site would be required to wear a portable worker unit 40. A person wearing the portable unit 40 has no ability to override the functions of the unit 40.

Certain workers are permitted or authorized to be within the work zone of selected pieces of equipment. For example, pipe-laying workers 30 would be permitted to be within the work zone of a backhoe with which they are working but may not be permitted to be within the working or danger zone of other vehicles or pieces of equipment on the work site. Other workers 32, 34 would not be permitted to be in the working zone 80. By way of another example, riggers or ironworkers may be permitted within the work or danger zone of a crane with which they are associated.

Each portable worker's units 40 have an associated code that identifies that unit, and, in effect, identifies that associated worker. Workers permitted to be in the work zone of a particular vehicle have their code from their associated unit programmed into the vehicle mounted control unit 24 of that vehicle. This can be preprogrammed either at the factory or through the data entry device 72.

During operation, the vehicle transceiver of the vehicle mounted control unit 24 transmits an interrogation signal, in effect, looking for workers within its zone of danger or work zone 80. If a worker comes within the zone, his potable unit receives the interrogation signal, transmits its code to the vehicle unit. If the vehicle mounted control unit 24 determines that the received code from a worker's portable unit 40 is that of an authorized worker, no further action is taken. If the code does not match, the alarms 74, 76 are activated to warn the vehicle operator 28. The unit 24 further transmits an alarm signal to the portable unit 40 of the unauthorized worker, e.g., 32, which, in turn, activates his alarms 98, 100.

The vehicle operator has the ability to override the alarm if desired through the data entry device 72 or via a reset switch.

FIG. 4 shows a flow diagram of a control process 200 for the vehicle mounted controller 24. The process starts at step 202. At step 204, codes or communication information to identify authorized workers are entered. This can be accomplished via the data entry 72 or preprogrammed at the time of manufacture. In step 206, the vehicle based unit transmits a signal to communicated with any worker carried portable unit 40 that is within it's work zone. The signal strength is adjusted to define the work zone based on the vehicle and the type of work site. In step 208, a determination is made as to whether a return signal is received. This may be in the form of a signal having a code that identifies the worker carried portable unit 40. If the determination is negative meaning no worker is within the work area 80, the process loops back to step 206. The steps 206 and 208 are continuously performed until a return signal is received. From an affirmative determination is step 208, a determination is made in step 210 as to whether the return signal identifies an authorized worker or not. If the determination is affirmative, the process loops back to step 206. The steps 206, 208 and 210 continuously repeat until an unauthorized worker is identified as being within the work zone of the vehicle based unit. An unauthorized worker leads to an affirmative determination in step 210. From an affirmative determination in step 210, the process proceeds to step 212 in which the alarm is activated in the vehicle based unit 24 to warn the vehicle operator of the unauthorized worker in the work zone 80. The vehicle based unit sends a signal to the portable unit to activate the portable unit alarm to also warn the worker that he is in a work zone in which he is not authorized to be in. In step 214, a determination is made as to whether the work zone area 80 has been cleared of the unauthorized worker. If the determination is negative in step 214, a determination is made in step 216 as to whether the vehicle operator has manually overridden the alarm. If the determination in step 216 is negative, the process loops back to step 212 and both alarms remain activated. From affirmative determinations in either steps 214 or 216, the process proceeds to step 218 in which the alarm of the vehicle based unit is reset. The process then loops back to step 206.

FIG. 5 shows a flow diagram of a control process 250 for the worker's portable warning unit 40. The process starts at step 250 and proceeds to step 254 in which a determination is made as to whether an interrogation signal has been received from a vehicle based unit. If the determination is negative, the process loops back upon itself and continues to monitor for receipt of an interrogation signal. From an affirmative determination in step 254, the process then transmits its identification code to the vehicle based system in step 256. The process then proceeds to step 258 in which the portable unit determines if an alarm signal has been received from the vehicle based unit. If the determination is negative, this means that the worker must be an authorized worker for that work zone and the process loops back to step 254 without an alarm being activated. If the determination is step 258 is affirmative, the process proceeds to step 260 in which the alarm of the worker unit 40 is activated. The process then loops back to step 254. If no further interrogation signal is received, i.e., the worker has left the work zone 80, its alarm would be reset and then again continuously monitor for another interrogation signal.

From the above description of the invention, those skilled in the art will perceive improvements, changes and modifications. For example, other type of signal communication arrangements between a vehicle based unit and the portable worker unit can be used other than that describe above in the exemplary embodiment to identify workers within a work zone and to warn unauthorized workers and the equipment operator of the unauthorized worker within the work zone. Such improvements, changes and modifications within the skill of the art are intended to be covered by the appended claims.

What is claimed is:

1. An apparatus for enhancing the safety in a work zone surrounding operating equipment including:
   a portable unit carried by a worker used for identifying the worker within said work zone and for providing information about the worker; and
   a control unit carried by the operating equipment for communicating with the portable unit carried by the worker in the work zone, said control unit distinguishing between an authorized worker and an unauthorized worker in said work zone, said control unit communicating with said portable unit to cause said portable unit to warn an unauthorized worker within said work zone.

2. The apparatus of claim 1 further including means for warning an operator of the equipment of presence of the unauthorized worker within said work zone.

3. An apparatus for enhancing the safety in a work zone surrounding operating equipment comprising:
   a portable worker carried unit carried by a worker for receiving signals and for transmitting signals indicative of worker information;
   an equipment mounted control unit including means for communicating with said portable worker carried unit in said work zone, means for transmitting a warning signal to said portable worker carried unit when said worker is not authorized to be within said work zone, and means for providing an operator of said equipment a warning of the presence of said unauthorized worker in said work zone; and
   said portable worker carried unit further including means for receiving said transmitted warning signal from said equipment mounted control unit and for providing a warning to the worker in response thereto.

4. The apparatus of claim 3 wherein said portable worker carried unit transmits a worker information code and wherein said equipment mounted control unit determines worker presence authorization in response to the worker information code.

5. A method for enhancing the safety in a work zone surrounding operating equipment including the steps of:
- identifying workers within said work zone;
- determining if an identified worker within a work zone is an authorized worker or an unauthorized worker permitted within that work zone for the associated operating equipment; and
- warning only determined unauthorized workers within said work zone.

6. The method of claim 5 further including the step of warning an operator of the equipment of presence of the determined unauthorized worker in the work zone.

7. A method for enhancing the safety in a work zone surrounding operating equipment comprising the steps of:
- carrying a portable worker carried unit by a worker for receiving signals and for transmitting signals indicative of worker information;
- providing an equipment mounted control unit for communicating with said portable worker carried unit in said work zone, transmitting a warning signal to said portable worker carried unit when said unit is not authorized to be within said work zone, and warning of the presence of said unauthorized worker in said work zone; and
- the portable worker carried unit further receiving said transmitted warning signal from said equipment mounted control unit and providing a warning to the worker in response thereto.

8. The method of claim 7 wherein the portable worker carried unit transmits a worker information code and wherein the equipment mounted control unit determines worker presence authorization in response to the worker information code.

9. An apparatus for enhancing the safety in a work zone surrounding operating equipment including:
- a portable unit carried by a worker used for identifying the worker within said work zone and for providing information about the worker; and
- a control unit carried by the operating equipment for communicating with the portable unit carried by the worker in the work zone, said control unit distinguishing between an authorized worker and an unauthorized worker in said work zone and providing a warning only when an unauthorized worker is within said work zone.

* * * * *